(12) United States Patent
Hanner

(10) Patent No.: US 10,925,278 B1
(45) Date of Patent: Feb. 23, 2021

(54) STABILIZED, COLLAPSIBLE PORTABLE SUPPORT PLATFORM

(71) Applicant: Roger Dale Hanner, Poplar Bluff, MO (US)

(72) Inventor: Roger Dale Hanner, Poplar Bluff, MO (US)

( * ) Notice: Subject to any disclaimer, the term of this patent is extended or adjusted under 35 U.S.C. 154(b) by 226 days.

(21) Appl. No.: 15/908,198

(22) Filed: Feb. 28, 2018

Related U.S. Application Data

(62) Division of application No. 13/872,355, filed on Apr. 29, 2013, now abandoned.

(51) Int. Cl.
*A01M 31/02* (2006.01)
*F16M 13/00* (2006.01)

(52) U.S. Cl.
CPC ............. *A01M 31/02* (2013.01); *F16M 13/00* (2013.01)

(58) Field of Classification Search
CPC ..................................................... A01M 32/02
See application file for complete search history.

(56) References Cited

U.S. PATENT DOCUMENTS

| | | | |
|---|---|---|---|
| 3,485,320 A | 12/1969 | Jones | |
| 3,960,240 A * | 6/1976 | Cotton | A63B 27/00 182/20 |
| 4,022,292 A * | 5/1977 | Van Gompel | A01M 31/02 182/33 |
| 4,321,983 A * | 3/1982 | Nelson | A01M 31/02 182/135 |
| 4,331,216 A * | 5/1982 | Amacker | A45F 3/26 182/135 |
| 4,493,395 A * | 1/1985 | Rittenhouse | A01M 31/02 108/152 |
| 4,549,633 A * | 10/1985 | Merritt | A01M 31/02 182/135 |
| 4,694,933 A | 9/1987 | Sinko | |
| 4,840,252 A | 6/1989 | Hucks, Jr. | |
| 4,953,662 A * | 9/1990 | Porter | A01M 31/02 108/152 |
| 5,156,236 A * | 10/1992 | Gardner | A01M 31/02 182/135 |
| 5,167,298 A * | 12/1992 | Porter | A01M 31/02 182/135 |
| 5,316,104 A | 5/1994 | Amacker | |
| 5,379,861 A | 1/1995 | Amacker | |
| 6,698,549 B2 * | 3/2004 | Graham, Jr. | A01M 31/02 182/136 |
| 7,322,443 B1 | 1/2008 | Rizza | |
| 7,370,728 B1 * | 5/2008 | Mann | A01M 31/02 182/187 |
| 7,458,563 B1 | 12/2008 | Liu | |
| 7,748,497 B2 | 7/2010 | Tolliver et al. | |
| 9,924,709 B1 * | 3/2018 | Hanner | A01M 31/02 |
| 2003/0173154 A1 | 9/2003 | Graham, Jr. et al. | |

* cited by examiner

*Primary Examiner* — Colleen M Chavchavadze
(74) *Attorney, Agent, or Firm* — R. Keith Harrison

(57) ABSTRACT

A stabilized, collapsible platform having at least two stages, each adjustable with respect to the other along a support column. In an illustrative embodiment, the platform may be adjusted along the support column with each stage moving independently of the other and secured in place to stabilize the platform against movement with respect to the support column.

17 Claims, 5 Drawing Sheets

STABILIZED, COLLAPSIBLE PORTABLE SUPPORT PLATFORM

CROSS-REFERENCE TO RELATED APPLICATIONS

This is a divisional of first U.S. divisional application Ser. No. 15/050,024, filed Feb. 22, 2016 and entitled STABILIZED, COLLAPSIBLE PORTABLE SUPPORT PLATFORM, which is a divisional of U.S. parent patent application Ser. No. 13/872,355, filed Apr. 29, 2013 and entitled STABILIZED, COLLAPSIBLE PORTABLE SUPPORT PLATFORM, each of which first divisional application, divisional application and parent patent application claims priority to U.S. provisional patent application No. 61/640,701, filed Apr. 30, 2012, and titled Zacchaeus Strap, the contents of which provisional patent application, parent patent application and first divisional application are incorporated herein by reference in their entireties.

BACKGROUND

1. Field

Illustrative embodiments of the disclosure relate generally to a collapsible portable support platform apparatus and, in particular, to an adjustable and collapsible apparatus having at least two stages that oppose movement of each other in at least one direction when the apparatus is deployed for use.

2. Discussion of Related Art

The background description provided herein is solely for the purpose of generally presenting the context of the illustrative embodiments of the disclosure. Aspects of the background description are neither expressly nor impliedly admitted as prior art against the claimed subject matter.

There is a wide array of existing apparatuses that may be attached to trees and other vertical support structures that can serve as platforms for supporting persons and other objects. Existing platforms are of variable design, but many generally include two separate sections for attachment to vertical support structures. Each section provides a separate area on which objects can rest. For example, there are a variety of tree stands used by hunters that employ two separate sections. Each section is deployed for use at a different height on the tree, and extends outward away from the tree enough to provide an area on which a hunter can stand or sit.

Sections of the aforementioned platforms are purposefully kept separate and movable in relation to one another at least because of the mechanism by which they are installed and used. A hunter, for example, will attach a tree stand platform's sections to a tree near the tree's base, and then walk those sections up the height of the tree one at a time, alternately placing weight on one while sliding the other up the tree. Once the section being slid has reached a desired height, the hunter then places weight on that section while sliding the other up the tree.

Once in place or deployed for use, the resulting platform provides at least two areas on which the hunter can rest-a top, "seat" section, and a bottom, "footrest" section. The seat and footrest sections of the platform are independently held in place during use by any of a number of mechanisms. Some are held in place by their own weight and/or the weight of the hunter pressing on the section(s), creating torque at the base of the section(s) and causing stabilization against the tree when the weight is applied.

However, such independently-positionable platform sections can be problematic. They can cause hassle to users by requiring unlatching or unlocking two separate mechanisms for removal and/or adjustment of the platform. Where those sections rely on weight for stability, as discussed above, they can be additionally problematic. For example, in the case of tree stands, where a hunter stands on one section and releases weight from another, the released section is subject to unintended, independent movement and erroneous repositioning if the hunter accidentally bumps into it, or if some other force causes its erroneous repositioning while released.

Accordingly, there is a need for a stabilized, collapsible portable platform that remedies the aforementioned deficiencies in the conventional art.

SUMMARY

The following brief description is provided to indicate the nature of the subject matter disclosed herein. While certain aspects of the present inventive concept are described below, the summary is not intended to limit the scope of the present inventive concept. Embodiments of the present inventive concept provide a lockable, portable support apparatus. The present inventive concept does not suffer from and remedies the deficiencies of conventional enclosures such as those previously set forth herein.

Illustrative embodiments of the disclosure are generally directed to an adjustable and collapsible apparatus having at least two stages that oppose movement of each other in at least one direction when the apparatus is deployed for use. In some embodiments, the adjustable and collapsible apparatus may include:

- a first stage configured for engagement with the support column for positional adjustment along the support column;
- a second stage configured for engagement with the support column in spaced-apart and substantially parallel relationship to the first stage, the second stage configured for positional adjustment relative to the first stage along the support column;
- the first stage and the second stage each configured to be stabilized against the support column by pressure applied in a direction substantially parallel to the support column; and
- a temporary lock attached to the first stage and the second stage, the temporary lock including:
  - at least one buckle attached to the first stage; and
  - at least one strap attached to the second stage and adjustably attached to the at least one buckle, the at least one buckle can be selectively released on the at least one strap for positioning of the first stage and the second stage relative to each other on the support column and the at least one buckle can be selectively locked on the at least one strap to restrict relative movement of the first stage and the second stage relative to each other on the support column.

Additional aspects, advantages, and utilities of illustrative embodiments of the present disclosure will be set forth in part in the description which follows and, in part, will be obvious from the description, or may be learned by practice of the present disclosure.

BRIEF DESCRIPTION OF THE DRAWINGS

Embodiments of the present inventive concept are described in detail below with reference to the attached drawing figures, wherein.

Figure 1:
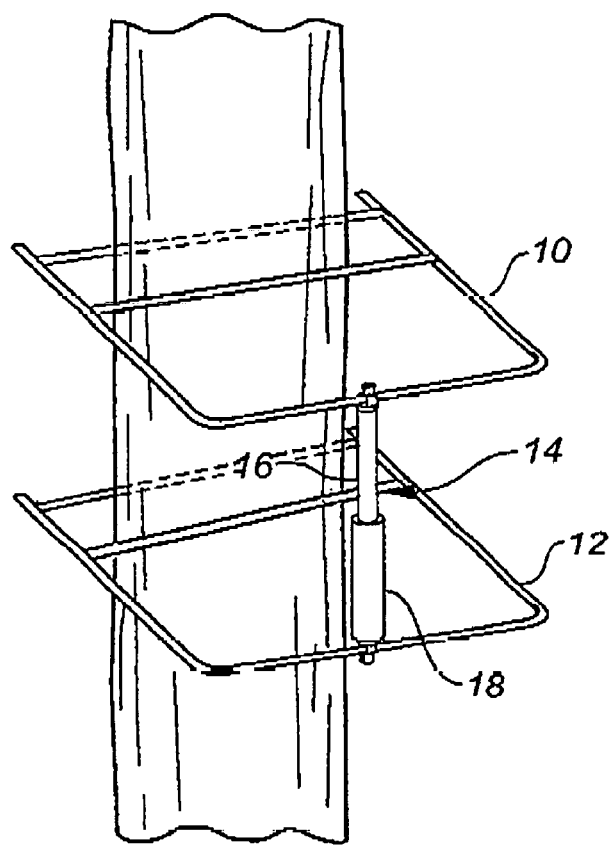
FIG. 1 is an elevated sectional view of an illustrative embodiment of the disclosure including a temporary lock having a rigid member.

The drawing figures do not limit the subject matter of the present disclosure to the specific embodiments disclosed and described herein. The drawings are not necessarily to scale, emphasis instead being placed upon clearly illustrating the principles of the disclosure.

DETAILED DESCRIPTION

The following detailed description of illustrative embodiments of the disclosure references the accompanying drawings that illustrate specific illustrative embodiments in which the disclosure can be practiced. The embodiments are intended to describe aspects of the disclosure in sufficient detail to enable those skilled in the art to practice the disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. References to "first stage" and "second stage" are used respectively to refer to stages positioned higher and lower on the illustrated support column(s) for ease of reference and description herein. However, this is not intended in a limiting sense, and the "first stage" may interchangeably be positioned lower than the "second stage" along the support column without departing from the spirit of the present inventive concept.

Existing apparatuses for providing a movable platform for supporting objects may be broken up into sections for easier adjustment along a support column, but are inherently unreliable and in some cases dangerous as a result of their fragmented designs. The present inventive concept addresses the aforementioned shortcomings of the related art by providing a platform apparatus capable of temporary locking to secure the parts of the platform together and, in preferred embodiments, to stabilize the platform against a support column.

Turning to the drawings and more particularly to FIG. 1, an apparatus of the present inventive concept is shown including a first stage 10 and a second stage 12 attached to a support column. The support column of FIG. 1 is a tree, and the means of attachment of the first and second stages 10, 12 is not shown. However, the first and second stages 10, 12 may be slidably attached to the tree using any means known in the art that allows for independent movement of the first and second stages 10, 12 along the tree. Also depicted is a temporary lock 14 including a rigid member having a piston 16 inserted into a sleeve 18. The rigid member is removably attached to each of the first and second stages 10, 12 with a wing screw. The apparatus may variably employ other known means of removably attaching the temporary lock to the stages without departing from the spirit of the present inventive concept. Alternatively, the temporary lock of this embodiment may be permanently attached to the stages in certain embodiments without departing from the spirit of the present inventive concept, as the temporary lock may be configured to allow movement of the stages relative to one another in an unlocked position.

The first and second stages 10, 12 of the embodiment of FIG. 1 may be "walked" up the tree in substantially the same fashion as is known in the art for adjusting hunter tree stands that have two independent sections (see discussion supra). Once in place, the temporary lock 14 may be attached to the first and second stages 10, 12, or to just one of the stages 10, 12 if already attached to the other previously. Final adjustments to the positions of the first and second stages 10, 12 may then be made by sliding the piston 16 within the sleeve 18 until the desired relative position is achieved, and the piston 16 may then be releasably fixed within the sleeve 18 using a fixing means such as a set screw (not shown). In this fashion, the first and second stages 10, 12 are materially restricted from relative movement.

Importantly, the temporary lock 14 is releasably locked to prevent movement of either of the first and second stages 10, 12 vertically along the height of the tree or from rotation about the tree unless there is corresponding movement of the other stage. This helps prevent unwanted and/or erratic movement of one of the stages 10, 12 with respect to the rest of the platform, which can sometimes be a problem with existing apparatuses where a user exerts different forces on the sections, or exerts force on one section but not another. In addition, in embodiments of the present inventive concept where a user may exert a downward pressure 32 on one or both stages to torque the stage(s) around the support column and stabilize the platform against the support column, this releasable locking of the stages together allows for the stabilizing pressure to be distributed across the platform even when applied to only one of the stages. In another embodiment, the platform may further be anchored to the support column, for example by a strap attached to the support column and releasably fixed to the rest of the platform.

Figure 2:
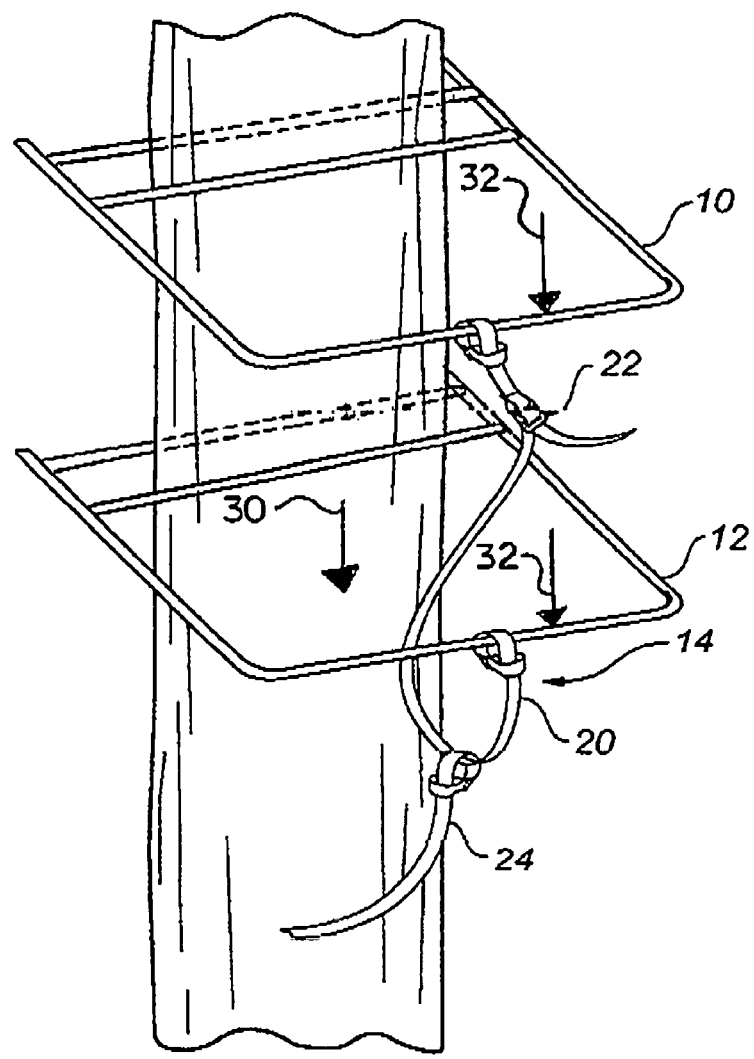
FIG. 2 is an elevated sectional view of an illustrative embodiment of the disclosure including a temporary lock anchored to a support column and having a strap and a buckle.

FIG. 2 illustrates an embodiment of the present inventive concept wherein the temporary lock 14 includes a strap 20 attached to the second stage 12 and that extends through a slidable connection with a first buckle 22 of the temporary lock 14 that is attached to the first stage 10. The first buckle 22 may be released to allow the strap 20 to slide freely within it, for example while the platform is "walked" into position or to allow for more precise adjustments, and may be releasably locked around the strap 20 to fix its position relative to the first buckle 22. In this way, the strap 20 can be tightened or loosened to set a desirable relative position of the first and second stages 10, 12 relative to one another, and the first buckle 22 may be releasably locked to engage (or lock) the temporary lock 14 and restrict relative movement of the stages 10, 12 to yield structural integrity benefits.

Figure 3:
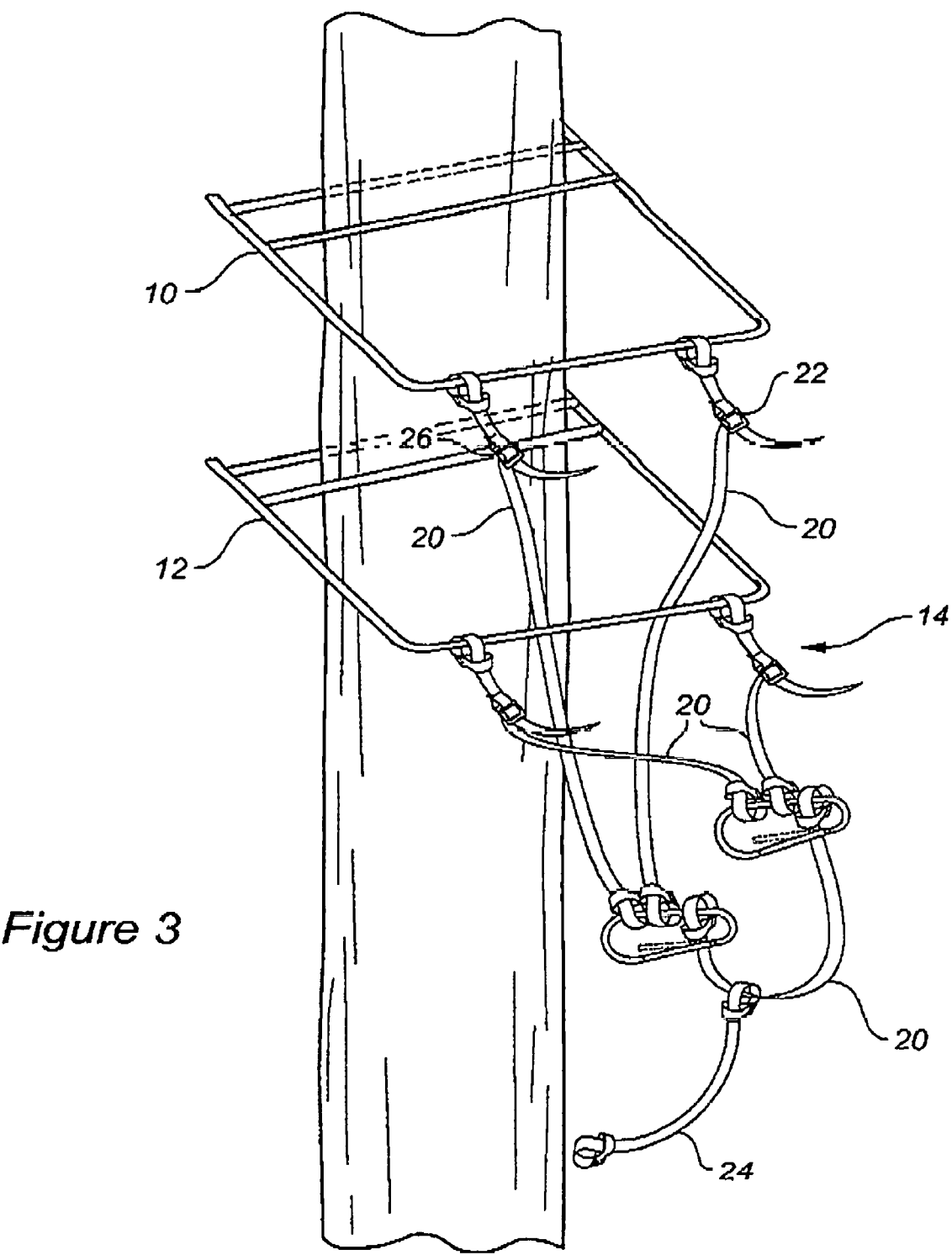
FIG. 3 is an alternative but related illustrative embodiment to the embodiment of FIG. 2.

In the preferred embodiment of FIG. 2, the platform further includes an anchor 24 fixed to the tree near its trunk and extending upward to intersect with the strap 20 at a loop. FIGS. 2 and 3 do not fully illustrate the means of fixing the anchor 24 to the tree new its trunk, but such means may be that illustrated in FIG. 4. It may alternatively be a means already known in the art. The loop is configured such that the strap 20 may slide within it when being pulled through the first buckle 22 during adjustment. The stages 10, 12 are slidably attached to the tree by known means that are configured to be stabilized against the tree by pressure 30 applied in a direction substantially parallel to the tree. For example, a rudimentary mechanism that could provide this sort of torque stabilization for a stage could include two metal or hard plastic bars, one positioned on the stage-side of the tree and the other on the opposite side of the tree, and both secured to or forming part of the stage. As a hunter presses down on one such a stage, the stage torques around the tree to press these bars in substantially opposing directions against opposite sides of the tree to stabilize the stage against sliding up or down.

The anchor 24 illustrated in FIG. 2 provides the added benefit of allowing both stages 10, 12, to be stabilized against the tree in this torqued fashion when the temporary lock 14 is engaged even in the absence of the hunter pressing down on one or both of the stages 10, 12. In this embodiment, the hunter can pull the strap 20 through the first buckle 22 until the second stage 12 is sufficiently torqued against the tree to provide added stability, and then may engage the temporary lock 14 by clamping the first buckle 22 down on the strap 20 such that the first stage 10 is also torqued and stabilized against the tree. The buckle of the present inventive concept may be any known type of releasable locking mechanism allowing for the flexible member or strap to be adjusted in relation to it until the lock is engaged and their relative position temporarily fixed.

FIG. 3 illustrates another embodiment of the present inventive concept wherein the strap 22 is broken up into several segments including a first stage end having two end strands attached to the first stage 10 at first and second buckles 22, 26 and to the main body of the strap 20 at a snap hook. The strap 22 further includes a second stage end having two end strands attached to the second stage 12 and to the main body of the strap 20 at a snap hook. Any known means for attaching the end strands to the main body may be used without departing from the spirit of the present inventive concept.

This embodiment operates in a similar fashion to that illustrated in FIG. 2, except that two buckles 22, 26 are adjusted and engaged to lock the temporary lock 14, instead of just the first buckle 22. Further, the embodiment of FIG. 3 provides for a more distributed force across the stages 10, 12 exerted by a tightened strap 20, thus minimizing the possibility that the platform will be pulled in unwanted directions while the temporary lock 14 is in the process of being set, and further helps combat the possibility that the ends of the taut strap 20 will move unexpectedly along one or both of the stages 10, 12 in a way that destabilizes the platform.

Figure 4:
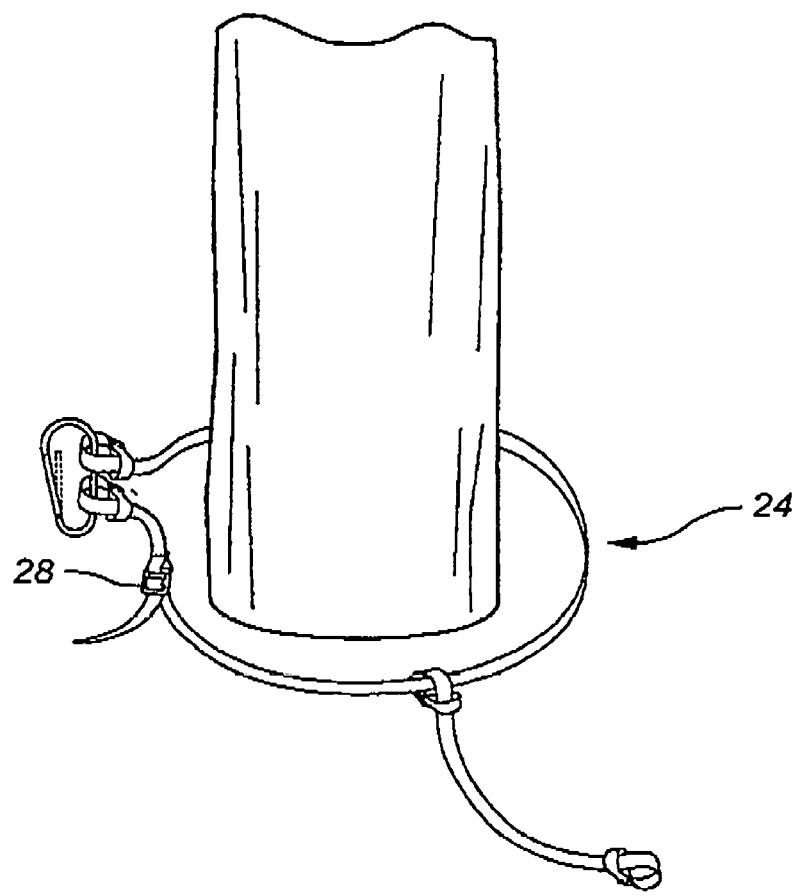
FIG. 4 is a detailed sectional view of the anchor of the illustrative embodiment of FIG. 3.

FIG. 4 illustrates an embodiment of the anchor 24 that includes several segments. The segments include a segment having a loop at one end and a buckle 28 on the other, a segment connected thereto by a snap hook on one end and extending through the buckle 28 near its other end. These two segments may be tightened around the trunk of the tree to provide a base for the anchor 24. A third segment loops over these first two and extends up toward and attaches to the remainder of the platform. Other known ways for anchoring the platform to the support column may be utilized without departing from the spirit of the present inventive concept.

Figure 5:
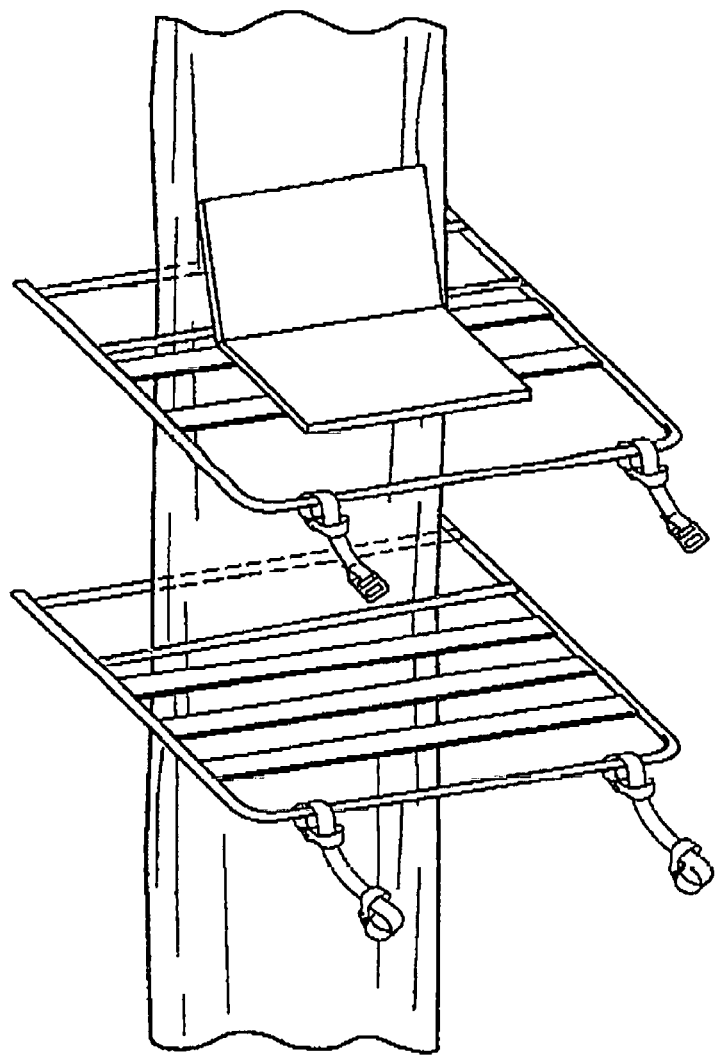
FIG. 5 is an elevated sectional view of an illustrative embodiment of the disclosure including more elaborate stages having seat and footrest structures.

FIG. 5 illustrates an embodiment of the present inventive concept having stages including a seat and a footrest.

While the embodiments illustrated and described herein include two platform stages, the temporary lock of the apparatus may be employed to help stabilize platforms having more than two stages without departing from the spirit of the present inventive concept.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

The invention claimed is:

1. A portable support platform for attachment to a support column, the platform comprising:
   a first stage configured for engagement with the support column for positional adjustment along the support column;
   a second stage configured for engagement with the support column in spaced-apart and substantially parallel relationship to the first stage, the second stage configured for positional adjustment relative to the first stage along the support column;
   the first stage and the second stage each configured to be stabilized against the support column by pressure applied in a direction substantially parallel to the support column; and
   a temporary lock attached to the first stage and the second stage, the temporary lock including:
      at least one buckle attached to the first stage; and
      at least one strap attached to the second stage and adjustably attached to the at least one buckle, the at least one buckle can be selectively released on the at least one strap for positioning of the first stage and the second stage relative to each other on the support column and the at least one buckle can be selectively locked on the at least one strap to restrict relative movement of the first stage and the second stage relative to each other on the support column;
   at least one anchor attached to the at least one strap, the at least one anchor configured for attachment to the support column;
   wherein the at least one anchor is looped to the at least one strap; and
   wherein the at least one anchor is configured to extend upwardly from the support column to the at least one strap.

2. The platform of claim 1 wherein the at least one buckle is looped to the first stage.

3. The platform of claim 1 wherein the at least one strap is looped to the second stage.

4. The platform of claim 1 wherein the at least one anchor comprises at least one segment configured to be secured around the support column.

5. The platform of claim 4 further comprising a second buckle on the at least one segment.

6. A portable support platform for attachment to a support column, the platform comprising:
   a first stage configured for engagement with the support column for positional adjustment along the support column;
   a second stage configured for engagement with the support column in spaced-apart and substantially parallel relationship to the first stage, the second stage configured for positional adjustment relative to the first stage along the support column;
   the first stage and the second stage each configured to be stabilized against the support column by a pressure applied in a direction substantially parallel to the support column;
   a temporary lock attached to the first stage and the second stage, the temporary lock including:
      at least one buckle attached to the first stage; and
      at least one strap attached to the second stage and adjustably attached to the at least one buckle, the at least one buckle can be selectively released on the at least one strap for positioning of the first stage and the second stage relative to each other on the support column and the at least one buckle can be selectively locked on the at least one strap to restrict movement of the first stage and the second stage relative to each other on the support column; and
      at least one anchor attached to the at least one strap, the at least one anchor configured for attachment to the support column and stabilizing the first stage and the second stage against the support column by applying the pressure in the direction substantially parallel to the support column.

7. The platform of claim 6 wherein the at least one buckle is looped to the first stage.

8. The platform of claim 6 wherein the at least one strap is looped to the second stage.

9. The platform of claim 6 wherein the at least one anchor comprises at least one segment configured to be secured around the support column.

10. The platform of claim 9 further comprising a second buckle on the at least one segment.

11. The platform of claim 9 wherein the at least one segment of the at least one anchor intersects with the at least one strap at a loop.

12. The platform of claim 6 wherein the at least one anchor is looped to the at least one strap.

13. The platform of claim 12 wherein the at least one anchor is configured to extend upwardly from the support column to the at least one strap.

14. A portable support platform for attachment to a support column, the platform comprising:
   a first stage configured for engagement with the support column for positional adjustment along the support column;
   a second stage configured for engagement with the support column in spaced-apart and substantially parallel relationship to the first stage, the second stage configured for positional adjustment relative to the first stage along the support column;
   the first stage and the second stage each configured to be stabilized against the support column by a pressure applied in a direction substantially parallel to the support column; and
   a temporary lock attached to the first stage and the second stage, the temporary lock including:
      at least one buckle attached to the first stage; and
      at least one strap attached to the second stage and adjustably attached to the at least one buckle, the at least one buckle can be selectively released on the at least one strap for positioning of the first stage and the second stage relative to each other on the support column and the at least one buckle can be selectively locked on the at least one strap to restrict relative movement of the first stage and the second stage relative to each other on the support column; and
      at least one anchor attached to the at least one strap, the at least one anchor configured for attachment to the support column and stabilizing the first stage and the second stage against the support column by applying the pressure in the direction substantially parallel to the support column, the at least one anchor configured to exert a downward pressure on at least one of the first stage and the second stage to torque the at least one of the first stage and the second stage around the support column and stabilize the platform against the support column.

15. The portable support platform of claim 14 wherein the at least one buckle is looped to the first stage.

16. The portable support platform of claim 14 wherein the at least one strap is looped to the second stage.

17. The portable support platform of claim 14 wherein the at least one anchor comprises at least one segment configured to be secured around the support column.

* * * * *